United States Patent [19]

Coppa et al.

[11] 4,047,191
[45] Sept. 6, 1977

[54] EXPOSURE CONTROL SYSTEM HAVING DYNAMIC APERTURE FLASH ARRANGEMENT

[75] Inventors: Richard J. Coppa, Westwood; Nathan Gold, Framingham, both of Mass.

[73] Assignee: Polaroid Corporation, Cambridge, Mass.

[21] Appl. No.: 642,986

[22] Filed: Dec. 22, 1975

[51] Int. Cl.² ............................................. G03B 7/14
[52] U.S. Cl. .................................. 354/27; 354/34; 354/133
[58] Field of Search ............... 354/27, 29, 30, 32–34, 354/129, 133, 139, 147, 149

[56] References Cited

U.S. PATENT DOCUMENTS

| 2,596,671 | 5/1952 | Fuerst | 354/139 |
| 3,659,509 | 5/1972 | Burgarella | 354/33 |
| 3,757,655 | 9/1973 | Kobayashi | 354/29 |
| 3,942,183 | 3/1976 | Whiteside | 354/29 |

Primary Examiner—L. T. Hix
Assistant Examiner—J. A. LaBarre
Attorney, Agent, or Firm—David R. Thornton

[57] ABSTRACT

A photoresponsive, shutter-diaphragm exposure control system having light regulating blades displaced from a light-blocking position to define increasing aperture values during an exposure interval includes a source of flash illumination which is energized with or just prior to initiation of the exposure interval for flash operation. In this arrangement, the flash illumination envelope is superimposed in a leading arrangement on the aperture opening curve so as to provide increasing illumination intensity in slightly leading relation to the increasing aperture values.

12 Claims, 5 Drawing Figures

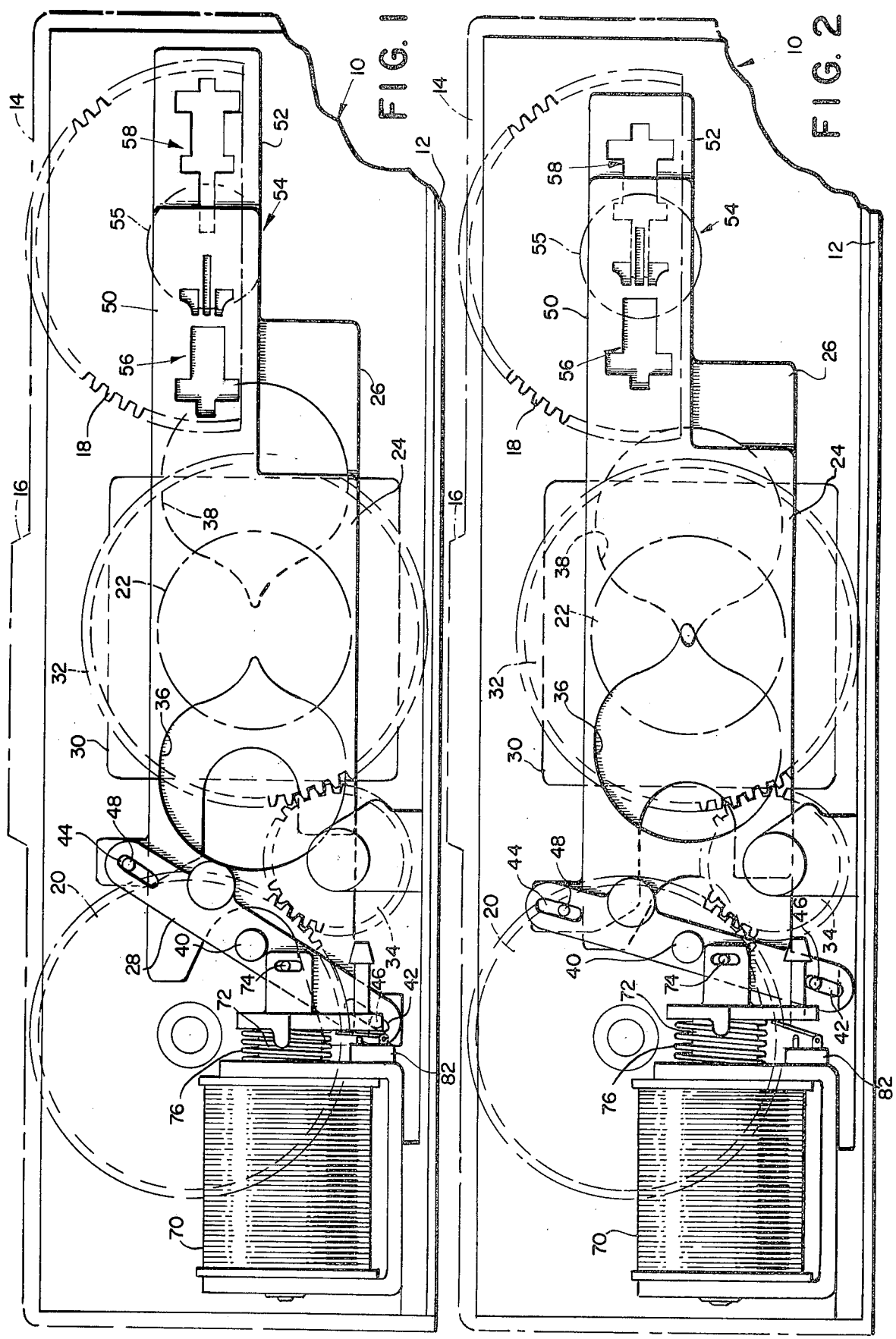

EXPOSURE CONTROL SYSTEM HAVING DYNAMIC APERTURE FLASH ARRANGEMENT

BACKGROUND OF THE INVENTION

This invention is directed to exposure control systems and, more particularly, to a dynamic aperture system suitable for both ambient and transient illumination operation.

FIELD OF THE INVENTION

Automatic exposure control systems designed for both ambient and flash illumination operation are well known in the prior art. Generally such systems require alternate control mechanisms designed for the different modes of operation; and are further complicated where fill-flash operation is desired. For example, in ambient operation, the taking aperture of such prior art systems are often automatically varied in accordance with ambient lighting conditions whereas in flash operations, the taking aperture is varied in accordance with subject distance. Furthermore, where fill-flash is desired for ambient mode operation, switching arrangements are generally required to provide flash firing without flash mode control.

Consequently, these different arrangements generally require alternate mechanisms which both increase camera expense and severely complicate camera control arrangements. Hence, it is a primary object of this invention to provide an improved automatic exposure control system configured for both ambient and transient illumination.

Another object of this invention is to provide an exposure control system uniquely configured for both flash and fill-flash operations.

A further object of this invention is to provide an improved exposure control system having a simplified flash arrangement.

Still another object of this invention is to provide an exposure control system operable without alteration under ambient and flash illumination.

A further object of this invention is to provide a method of exposing photographic film material under flash illumination.

SUMMARY OF THE INVENTION

Briefly, the exposure control system of the invention utilizes a pair of light regulating blades which are driven from a light-blocking to an unblocking position to initiate an exposure interval, during which light is transmitted to the focal plane of the camera and then, in accordance with a photoresponsive unit which senses scene illumination, the blades are returned to their blocking position to terminate the exposure. During their opening movement, the blades define increasing aperture values at a predetermined rate so that the maximum aperture value achieved, during an exposure, is a function of the scene illumination. Included in the system are means for receiving a source transient illumination which upon actuation, provides illumination rising at a predetermined rate to a peak intensity, and means for actuating the source of illumination at or just prior to initial exposure defining opening of the blades such that the rise in illumination corresponds to the increasing aperture values such that the system thereby responds to the transient illumination as well as any available ambient illumination.

In the illustrated embodiment, the light regulating blades also provide correlated, increasing aperture values before the photocell unit to control the latter in leading relation to the taking aperture, and the source is actuated just prior to the initial definition of photocell aperture values so that the rise in illumination is in slightly leading arrangement to the blade opening curves with the rate of increase in illumination approximating the rate of increase of aperture values.

BRIEF DESCRIPTION OF THE DRAWINGS

The normal features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 1 is a diagrammatic, front elevational view of an exposure control mechanism incorporating features of the instant invention, the view having portions broken away or removed to reveal internal structure;

FIG. 2 is a front elevational view of the exposure mechanism of FIG. 1 showing the components thereof in an orientation defining aperture openings;

DETAILED DESCRIPTION OF THE INVENTION

Figure 5:
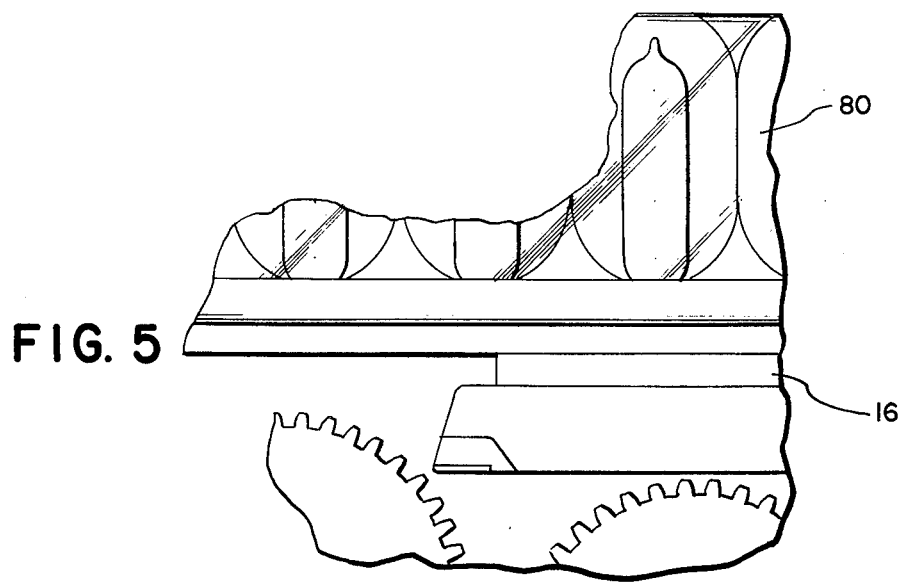
FIG. 5 is a fragmentary view of the exposure mechanism of FIG. 1 in combination with a flash array.

Referring now to FIGS. 1 and 2, it can be seen that the exposure control system includes a housing 10 which comprises a rear casting 12 selectively machined to support the components of the mechanism. Surrounding the front and top of the casting 12 is a cover 14 which is structured as shown at 16 to provide a flash socket or receptacle 16 configured to receive a flashlamp array 80 (see FIG. 5) and which includes openings (not shown) through which protrude manually adjustable trim and focus wheels partially shown in dotted outline at 18 and 20, respectively. Centrally disposed within the back wall of casting 12 is an exposure or light entering opening 22 which defines the maximum available exposure aperture for the system.

Mounted on casting 12 are a pair of elongated blades 24 and 26 which cooperate with an interconnecting actuator or walking beam 28. The blades 24 and 26 are slideably mounted on casting 12 by means of a bracket 30 which also serves to support an externally threaded lens housing illustrated at 32. Connection between the lens assembly 32 and the focus wheel 20 is provided by an idler gear shown at 34 such that rotation of the focus wheel 20 provides displacement of the lens assembly 32 for focusing of image-carrying rays through the main aperture to a rearwardly positioned film plane (not shown) when the exposure system of FIG. 2 is employed in conjunction with a suitable film exposure chamber.

A pair of openings 36 and 38 formed in the blades 24 and 26 provide variable aperture openings in accordance with longitudinal displacement of one blade with respect to the other responsive to movement of the walking beam 28. In this respect, it can be seen that the walking beam 28 is journaled for rotation around a stud 40 extending from rear casting 12. Elongate slots 42 and 44 formed in the distal ends of the walking beam 28 provide coupling with pins 46 and 48 fixed to and extending respectively from blades 24 and 26. Thus interconnected, the blades 24 and 26 move simultaneously with each other to define a main or taking aperture of progressively varying value over the light entrance opening 22.

Figure 4:
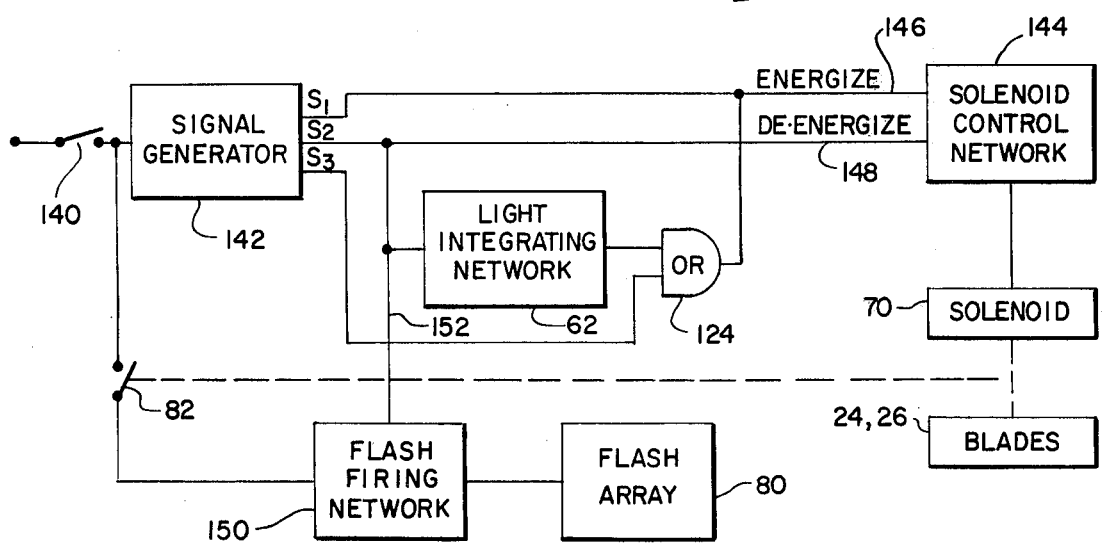
FIG. 4 is a block diagram showing the functional components and circuit relationships of a control system utilized in the mechanisms shown in FIGS. 1 and 2.

The blades 24 and 26 include end portions shown respectively at 50 and 52 which extend through a light detecting station 54 in overlying relation to a photoelectric cell 55 of a light integrating unit 62 shown in FIG. 4. Carried in the end portions 50 and 52 are openings 56 and 58 which in accordance with blade movement define over the photocell 55 a secondary or photocell aperture of progressively varying value correlated to the main aperture value. Hence, the instantaneous aperture values defined by the secondary openings 56 and 58 are derived in synchronism with the primary aperture values provided by the openings 36 and 38. Many different light integrating networks available in the prior art would be suitable for the present exposure control system. Exemplary of such arrangements is a light integrating network providing a rapid response and employing a light sensor, such as a silicon photodiode, arranged to operate in a current mode in conjunction with a feedback amplifier and timing capacitor such as described in detail in U.S. Pat. No. 3,620,143.

A tractive electromagnetic device in the form of a solenoid 70 is employed to displace the shutter blades 24 and 26 with respect to each other and the casting 12. As illustrated in FIG. 1 of the drawings, the solenoid plunger 72 is affixed to the walking beam 28 by means of a pin or stud 74 such that displacement of the armature 72 will rotate the walking beam 28 around its pivot pin 40 and appropriately displace the shutter blades 26 and 28. A spring member 76 surrounds the solenoid plunger 72 and biases it toward the shutter blades so as to tend to bias them to an open aperture condition. This arrangement is designed for use in a reflex camera in which a normally open shutter condition facilitates viewing and focusing procedures. Consequently, in the present arrangement, the shutters are drawn to their closed position as shown in FIG. 1 only while the solenoid 70 is energized. De-energization of the solenoid 70 permits the shutter blades 24 and 26 to move toward their maximum aperture opening under the urging of the spring 76. This driving arrangement for the exposure control mechanism is described in more detail in U.S. Pat. No. 3,868,712 entitled, "Pneumatically Reactive Exposure Control System" issued to Conrad H. Biber on Feb. 25, 1975.

Hence, in the exposure mechanism shown in FIG. 1, the shutter blades 24 and 26 are displaced to an open aperture position, as for example as shown in FIG. 2, by de-energizing the solenoid 70 to permit the spring 76 to drive plunger 72 outwardly of the solenoid and, in turn, rotate walking beam 28 in a counterclockwise direction as viewed in FIGS. 1 and 2 so as to force the aperture forming openings 36, 38, 56 and 58 into increasing coincidence as shown in FIG. 2. As later explained with regard to FIG. 4, the exposure interval is then terminated (in accordance with operation of the light integrating network 62) by again energizing the solenoid 70 so as to retract the plunger 72 against the force of the spring 76.

As later explained more fully with regard to the overall operation, the exposure control system of the invention operates in substantially identical fashion for both flash and ambient operation, except for the firing of a flashlamp. That is, insertion of the flash array 80 within the housing socket 16, as shown in FIG. 4, automatically provides flash illumination during a subsequent exposure regardless of the ambient light level thereby providing a so-called flash exposure in low ambient or a flash-fill exposure when sufficient ambient light is available.

In this arrangement, the exposure system circuit, as later explained with regard to FIG. 4, fires a flash in timed relation to the blade opening so as to provide actual incandescence at or just prior to initial opening of the blades or, that is, just prior to initial definition of minimum aperture values for the taking aperture and the photocell aperture. In the illustrated embodiment, timing of the flash firing is carried out by a switch 82 which cooperates with the solenoid plunger 72 so as to be altered from a nonductive ("off") state, shown in FIG. 1, to a conductive ("on") state, shown in FIG. 2, as the plunger is released responsive to de-energization of the solenoid 70.

Prior to completing the description of the flash arrangement, the ambient mode operation will be explained. While the exposure control system of the present invention is intended to be employed in a single lens reflex camera, as is shown, for example, in U.S. Pat. No. 3,820,128 in which a movable motor driven mirror is utilized to alter the camera from a viewing to an exposure mode, the latter is not pertinent to the present invention which deals solely with the exposure interval. Hence, the reflex viewing system will be only briefly described. In this arrangement, once the camera is actuated by closing on an actuator switch, designated at 140 in FIG. 4, the exposure chamber is first prepared for exposure by moving the mirror (not shown) and by energizing the solenoid 70.

Looking now to FIG. 4, wherein an exemplary electrical circuit employed in the exposure control system is shown, it can be seen that a signal generator 142 is in connection to the switch 140 which in its "on" condition triggers or activates the generator to produce in sequence three timed signals designated $S_1$, $S_2$ and $S_3$. A solenoid control network 144 which may take the form of a flip-flop network capable of assuming one of two stable states to control the passage of voltage to the solenoid 70 to thereby either energize or de-energize the latter in accordance with signals on the input lines 146 or 148, respectively.

Initially, the generator 142 produces the $S_1$ signal which places the network 144 in a solenoid energizing mode through the line 146. This $S_1$ signal also energizes the motor driven mirror (not shown) to set the latter in an exposure position. Just following the $S_1$ signal, which closes the blades 24 and 26 and allows time for the mirror operation, the generator 142 then produces the second signal $S_2$ which, through the line 148, operates the solenoid control network 144 to de-energize solenoid 70 and allow opening of the blades 24 and 26 thereby initiating the exposure interval. As shown in this figure, the light integrating circuit 62 is also activated at this time.

When sufficient light has been received by the photocell 55, the network 62 passes a signal through an "or" gate 124 to the line 146 so as to again energize the solenoid 70 and thereby return the blades 24 and 26 to a closed position which terminates the exposure interval. After a sufficient period of time, greater than the longest expected exposure interval, the generator 142 produces a fail-safe signal $S_3$ which will also energize the solenoid to terminate the interval when the scene light is inadequate to trip the light integrating network. In practice, the timing of $S_2$ is only a few milliseconds after $S_1$ and preferably merely enough to provide energization of the solenoid 70 and completion of the mirror movement. On the other hand, the $S_3$ signal preferably would follow the $S_2$ signal by approximately 30 milliseconds so as to always permit completion of a conventional exposure interval.

Figure 3:
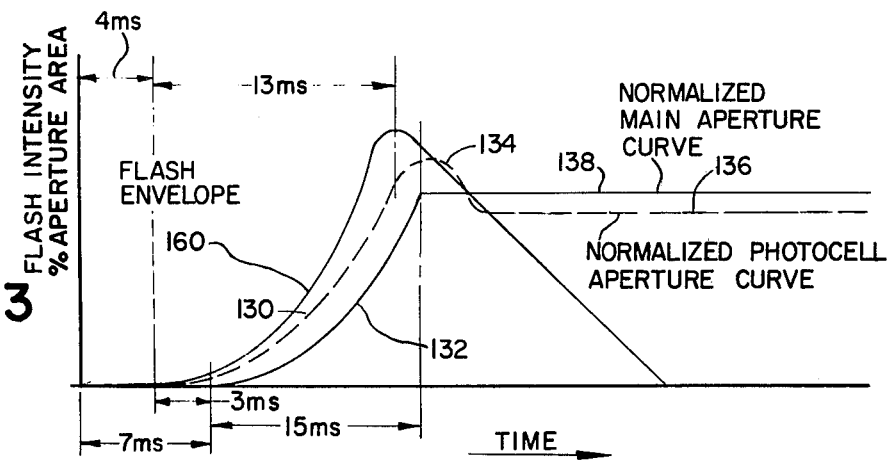
FIG. 3 is a graph illustrating the relationship between the main and photocell aperture curves and the flash envelope of the exposure control mechanism depicted in FIG. 1.

In the illustrated embodiment, as the blades 24 and 26 are driven from a closed to a full open position, the secondary photocell aperture defined by openings 56 and 58 produce a curve as depicted in FIG. 3 at 130. Likewise, the primary or main exposure aperture also defines a curve as depicted at 132. In practice, the photocell aperture value is much smaller than the main aperture value, but in this figure, the curves are normalized and plotted against percent aperture area. The normalized photocell area being defined as one which provides a correct exposure interval for a scene brightness where a long exposure time is employed and, hence, opening and closing times become negligible. The final photocell aperture shown in this figure represents this normalized area.

As can be seen in FIG. 3, the photocell aperture leads the main aperture, that is, opens earlier and at a slightly faster rate relative to its full open position than does the main aperture. In the illustrated embodiment, the initial opening or first light through the photocell aperture leads the taking aperture by approximately 4 or 5 milliseconds which occurs because the relatively closely spaced photocell aperture defining openings 56 and 58 begin to overlap sooner than the main aperture defining openings 36 and 38 when the blades are displaced relative to each other in a direction to open the shutter-diaphragm. This photocell lead is employed so that the light integrating unit can provide an adequate anticipation of, or brightness sample related to, the total amount of light passing through the main aperture by the time the blades are closed, and thus takes into account solenoid reaction time and the blade closing time, etc.

Hence, it should be understood that the photocell 55 in conjunction with the secondary openings 56 and 58 provide means for measuring scene brightness as a function of the taking aperture value and the integrator 62 provides means for summing this measurement and for giving an appropriate signal when the summed amount equals a predetermined value.

For low scene light conditions, the system is designed to provide a maximum main aperture (designated at 138) which is determined by opening 22. Preferably, the photocell opening is also configured to reach a maximum designated at 134 at that time, however, the photocell aperture then decreases to the normalized area shown at 136 since the required anticipation is lessened at long exposures.

Prior to completing the description of the flash timing relation to the dynamic aperture values of the system, details of the flash arrangement will be explained. As previously indicated, the novel exposure control system includes a socket arrangement designed for the use with a flash array 80, for example, a socket arrangement as shown and described in U.S. Pat. No. 3,745,895. A suitable flash array is shown and described in U.S. Pat. Nos. 3,598,984 and 3,598,985. The flash array is constructed to employ a plurality of incandescent flashlamps, such as that shown and described in U.S. Pat. No. 2,982,119, which are sequentially ignited by application of a suitable voltage to the lamp filament. Each lamp is designed to provide sufficient scene illumination at far subject distances of slightly greater than 15 feet to properly expose the film material when the taking aperture is at its maximum value.

Upon energization of the filament in a typical lamp of this type, actual ignition of the combustible material occurs approximately 4 milliseconds later at which point the light intensity rises rapidly to a peak intensity in approximately 13 milliseconds and then trails off as lamp combustion goes to completion so that the total duration of light energy from the lamp is in the order of 30 to 35 milliseconds. This provides a flash envelope curve as shown at 160 in FIG. 3.

As later explained in detail with regard to FIG. 3, the rise time and flash duration are utilized to provide compatible flash and ambient operation by igniting the flash just prior to blade opening and by mating the blade opening curves in a tracking relation to the flash rise.

Referring to FIG. 3, it can be seen that both the photocell aperture curve 130 and the main aperture curve 132 rise in substantially smooth curves from the closed blade position, or from their zero percent aperture to the respective points where their maximum aperture values occur. The secondary or photocell aperture values follow a curve 130, roughly parallel to that of the main aperture but in leading arrangement thereto, with the lead increasing slightly as the curve 130 approaches its maximum. The lead provides an adequate anticipation factor which takes into account the light received after the light integrator has produced its close command. In the illustrated embodiment, the rise time of the main or taking aperture is made to be approximately 15 milliseconds such that its rate of increase of aperture value approximates the 13 millisecond rate of increase of the flash intensity.

The rate at which the aperture values vary is, of course, a function of the solenoid 70, the spring rate of the spring 76 and the shape of the blade openings 36, 38 and 56, 58. In the illustrated embodiment, these factors have been adjusted to provide the above-noted aperture curves.

Preferably, the rate of progressive change of aperture value is chosen to substantially track the rate of increase of flash illumination with timed firing of the flash just prior to initial definition of the apertures, and all of these factors are important considerations for providing proper exposure over a wide range of subject distances.

In the illustrated embodiment, the flash fire lead time is sufficient that when the taking aperture first begins to open, the flash is already producing considerable illumination energy. Likewise, since the rising curves are made roughly parallel, the flash lead remains roughly constant throughout such that the flash begins to peak as the main aperture has completed approximately 50% of its rise time.

In the illustrated embodiment, the flashbulb actually ignites or begins to emit light approximately 4 milliseconds after firing and then rises smoothly to its peak value. Hence, start of actual flash illumination leads the taking aperture (first light) by approximately 3 milliseconds. Likewise, the photocell aperture initially leads the taking aperture by approximately 3 milliseconds such that the photocell begins to see first light at about the time the flashbulb starts to emit its light. With the described arrangement, suitable ambient and flash exposure have been realized for subject distances ranging from near distances of 2 ft. to far distances of 13 ft. Of course, ambient operation is suitable over a far greater range.

It should be noted that if the total flash energy is merely reduced (i.e., by use of a flashbulb of lower intensity) or if the flash lead time is significantly increased, the practical effect is to reduce the available light (provide underexposure) at the far end of the subject distance range. On the other hand, significant reduction in the flash lead time or marked changes in the tracking relation of the flash and aperture curves can provide varied effects over the subject distance range. Hence, while reasonable operation may be achieved with a flash lead time varying from near zero to slightly over one-half the flash rise time, overexposure tends to occur when the flash lead is eliminated, and if the aperture curves are altered so as to rise much more steeply or much more slowly than the flash rise, both over and underexposure can occur.

The flash mode operation of the camera will now be described. Flash firing, which as previously indicated is controlled by the solenoid activated switch 82, employs, as shown in FIG. 4, a flash firing circuit 150 such as, for example, is described in U.S. Pat. No. 3,676,045. The latter circuit is constructed to sequentially fire each flashbulb in their arranged order in the flash array 80 responsive to both energization of the firing circuit and application of a trigger signal. Once triggered into operation, the firing circuit automatically continues to supply ignition current to the next unfired flashbulb in the array until the latter is fully ignited, and then clamps off actuation of any further flashbulbs until a further trigger signal is received.

While applicable to non-SLR arrangements, the novel exposure control system described herein is intended for use in a through-the-lens viewing system in which the blades are opened for viewing purposes following each exposure. Hence, the solenoid 70 and, more importantly, the flash firing switch 82 are operated twice during each complete cycle of the reflex system. However, provision is made to only fire a flash during blade opening which produces a film exposure. This is provided by the arrangement described in detail below where flash firing requires both the $S_2$ signal and activation of the firing switch 82.

As can be seen from FIG. 4, the flash firing network 150 is coupled to both the system actuator switch 140 and to the $S_2$ signal. In this arrangement, the flash firing network 150 is energized through the switch 82 while it receives $S_2$ as its trigger signal by way of the line 152. The switch 82, as previously noted in regard to FIGS. 1 and 2, is actuated in accordance with actuation of the blades 24, 26 or more precisely the solenoid 70. Hence, in the illustrated embodiment, the $S_2$ signal is delivered to the flash firing network at the same time as it is fed to the solenoid control network 144 to de-energize the solenoid 70. However, the firing network does not fire until energized by switch 82 upon actual movement of the solenoid plunger 72. For this purpose, the $S_2$ signal is made of long enough duration to allow energization and start of bulb ignition, at which point the firing circuit continues to ignite the bulb even after termination of the $S_2$ signal.

Proper timing of the flash fire just prior to the actual start of blade opening or, that is, first light through the photocell aperture is determined by the position of the switch 82 relative to the solenoid plunger 72. Hence, the switch 82 provides means for sensing the blade actuation and in conjunction with the flash firing network 150 provides means for firing a flash in at a predetermined time prior to opening of the blades. Advantageously, the flash is automatically fired during an exposure regardless of ambient. Hence, fill-flash is automatically provided by mere insertion of the flash array.

It should be noted that the flash trigger signal is herein described as the $S_2$ signal, however, since firing is accomplished by mere coincidence between the trigger signal and energization of the flash firing circuit 150, many different arrangements would be useful. The firing switch 82 may be served by any means for sensing the initiation of blade opening. Further, the firing circuit 150 may be energized at any time prior to initiation of the exposure signal and the switch 82 placed in the trigger line 152. Additionally, a timed signal from the generator 142 may also be employed to replace the switch 82 and provide timing of the flash fire. Each of these arrangements can provide proper firing of the flash in timed relationship to the blade opening curve as previously described.

Those familiar with the photographic arts will readily appreciate the novel and highly unique advantages of the invention wherein a shutter-diaphragm exposure system provides ambient, fill-flash, and flash operation without mechanical variations. In the novel arrangement, the system automatically responds to either ambient or flash illumination and operates in essentially the same manner in each to provide an uncomplicated, highly reliable system for all modes of operation.

Since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. A photographic exposure control system for use with a source of flash illumination for transmitting light from a scene along a given optical path to expose photographic material located at a given film plane, said source of illumination being configured upon actuation to provide flash illumination whose intensity increases at a given rate to a given peak intensity, said system comprising:

a blade mechanism mounted for displacement between a first terminal position wherein said blade mechanism is in blocking relation to said given optical path and a second terminal position wherein said blade mechanism is in unblocking relation to said given optical path, said blade mechanism defining primary aperture values progressively increasing from a minimum to a maximum value in operative relation to said given optical path during displacement from said first to said second position;

drive means actuatable for displacing said blade mechanism between its said first and second positions at a given rate of displacement providing a predetermined rate of increase of aperture value;

means for sensing the brightness of the scene to be photographed and for providing an exposure value in accordance therewith;

control means for actuating said drive means to displace said blade mechanism from its said first position toward its said second position to define said increasing aperture values and initiate an exposure interval during which scene light is passed along said given optical path, for actuating said source to initiate illumination therefrom just prior to said blade mechanism defining said minimum aperture value, and in response to said brightness sensing means for displacing said blade mechanism into blocking relationship with said given optical path to terminate said exposure interval, said source actuating means including means for actuating said source at a time prior to said blade mechanism defining said minimum aperture value and sufficient for providing both ignition of said source and an increase in intensity to approximately its said given peak intensity as said blade mechanism achieves one-half of its said maximum aperture value.

2. The system of claim 1 wherein said drive means is configured for displacing said blade mechanism at a rate providing a predetermined rate of increase of aperture value approximating said given rate of increase of illumination intensity.

3. The system of claim 1 wherein said brightness sensing means includes a light sensing element, and said blade mechanism additionally unblocks said element and defines secondary aperture values progressively increasing from a minimum to a maximum in operative relation to said element and in tracking relation to said primary values during displacement of said blade mechanism from said first to said second position.

4. The system of claim 3 wherein said blade mechanism defines said secondary aperture values in leading arrangement to said primary aperture values such that the minimum value of said secondary aperture values is defined at approximately the time of initiation of illumination from said source.

5. A photographic exposure control system for use with a source of flash illumination for transmitting light from a scene along a given optical path to expose photographic material located at a given film plane, said source of illumination being configured upon actuation to provide flash illumination whose intensity increases at a given rate to a given peak intensity, said system comprising:

a blade mechanism mounted for displacement between a first terminal position wherein said blade mechanism is in blocking relation to said given optical path and a second terminal position wherein said blade mechanism is in unblocking relation to said given optical path, said blade mechanism defining primary aperture values progressively increasing from a minimum to a maximum value in operative relation to said given optical path during displacement from said first to said second position;

drive means actuatable for displacing said blade mechanism between its said first and second positions at a given rate of displacement providing a predetermined rate of increase of aperture value approximating said given rate of increase of illumination intensity;

means for sensing the brightness of the scene to be photographed and for providing an exposure value in accordance therewith;

control means for actuating said drive means to displace said blade mechanism from its said first position toward its said second position to define said increasing aperture values and initiate an exposure interval during which scene light is passed along said given optical path, for actuating said source to initiate illumination therefrom just prior to said blade mechanism defining said minimum aperture value, and in response to said brightness sensing means for displacing said blade mechanism into blocking relationship with said given optical path to terminate said exposure interval.

6. The system of claim 5 wherein said brightness sensing means includes a light sensing element, and said blade mechanism additionally unblocks said element and defines secondary aperture values progressively increasing from a minimum to a maximum in operative relation to said element and in tracking relation to said primary values during displacement of said blade mechanism from said first to said second position, said blade mechanism defining said secondary aperture values in leading arrangement to said primary aperture values such that the minimum value of said secondary aperture values is defined at approximately the time of initiation of illumination from said source.

7. A photographic exposure control system for use with a source of flash illumination for transmitting light from a scene along a given optical path to expose photographic material located at a given film plane, said source of illumination being configured upon actuation to provide flash illumination whose intensity increases at a given rate smoothly from zero to a given peak intensity in approximately 13 milliseconds, said system comprising:

a blade mechanism mounted for displacement between a first terminal position wherein said blade mechanism is in blocking relation to said given optical path and a second terminal position wherein said blade mechanism is in unblocking relation to said given optical path, said blade mechanism defining primary aperture values progressively increasing from a minimum to a maximum value in operative relation to said given optical path during displacement from said first to said second position;

drive means actuatable for displacing said blade mechanism between its said first and second positions at a given rate of displacement providing a predetermined rate of increase of aperture value approximating said given rate of increase of illumination;

means for sensing the brightness of the scene to be photographed and for providing an exposure value in accordance therewith;

control means for actuating said drive means to displace said blade mechanism from its said first position toward its said second position to define said increasing aperture values and initiate an exposure interval during which scene light is passed along said given optical path, for actuating said source to initiate illumination therefrom approximately 3 milliseconds prior to said blade mechanism defining said minimum aperture value, and in response to said brightness sensing means for displacing said blade mechanism into blocking relationship with said given optical path to terminate said exposure interval.

8. A photographic exposure control system for use with a source of flash illumination for transmitting light from a scene along a given optical path to expose photographic material located at a given film plane, said source of illumination being configured upon actuation to provide flash illumination whose intensity increases at a given rate to a given peak intensity, said system comprising:

means including a light sensing element for sensing the brightness of the scene;

a blade mechanism mounted for displacement between a first terminal position wherein said blade mechanism is in blocking relation to said given optical path and said light sensing element and a second terminal position wherein said blade mechanism is in unblocking relation to said given optical path and said light sensing element, said blade mechanism defining aperture values progressively increasing from minimum to maximum values in operative relation to said given optical path and said light sensing element during displacement from said first to said second position;

drive means actuatable for displacing said blade mechanism between its said first and second positions at a given rate of displacement providing a predetermined rate of increase of aperture values approximating said given rate of increase of illumination intensity;

control means for actuating said drive means to displace said blade mechanism from its said first position toward its said second position to define said increasing aperture values and initiate an exposure interval during which scene light is passed along said given optical path, for actuating said source of illumination just prior to said blade mechanism defining said minimum aperture value in operative relation to said optical path, and in response to said brightness sensing means for displacing said blade mechanism back to its said first position to terminate said exposure interval.

9. A method of operating photographic apparatus to expose photographic film material under flash illumination by controlling the passage of image carrying rays along a given path from the scene to be photographed, said flash of illumination having a flash intensity which upon initiation of said flash rises rapidly at a given rate to a maximum, said apparatus including a light sensing element and a blade mechanism, said blade mechanism actuatable to unblock and block said optical path and to provide progressively changing aperture values in operative relation thereto, said method comprising the steps of:

initially actuating said blade mechanism to unblock said path substantially simultaneously with or at a predetermined time after initiation of said flash and to define aperture values progressively increasing from relatively small to relatively large aperture values at a predetermined rate approximating said rate of rise of flash intensity; and subsequently actuating said blade mechanism responsive to the total amount of light received by said light sensing element to again block the optical path.

10. The method of claim 9 wherein said initially actuating step includes actuating said blade mechanism to unblock said path a predetermined time after initiation of said flash of illumination.

11. The method of claim 9 wherein said initially actuating step includes actuating said blade mechanism to unblock said path after a predetermined time approximating one-quarter of the time required from initiation of said flash to maximum intensity.

12. A method of exposing photographic film material under flash illumination by controlling the transmission of image carrying light rays along a main optical path from a photographic scene to said film material, said flash of illumination having a flash intensity which upon initiation rises rapidly at a given rate to a maximum and then decays, said method comprising the steps of:

initiating an exposure interval by unblocking said main optical path substantially synchronously with or a predetermined time after initiation of said flash and simultaneously forming aperture values in operative relation to said main optical path progressively increasing from relatively small to relatively large aperture values at a predetermined rate approximating said rate of rise of flash intensity;

measuring the brightness of said scene during said exposure interval as a function of said aperture values; and terminating said exposure interval responsive to the measured brightness of said scene by again blocking said main optical path.

* * * * *